APARTMENT TELEPHONE-INTERCOM AND DOOR RELEASE SYSTEM

Filed July 11, 1966 3 Sheets-Sheet 1

INVENTOR.
JOHN T. MATTHEWS
BY
Russell H. Mecklemann
AGENT

Dec. 16, 1969 J. T. MATTHEWS 3,484,561

APARTMENT TELEPHONE-INTERCOM AND DOOR RELEASE SYSTEM

Filed July 11, 1966 3 Sheets-Sheet 2

3,484,561
APARTMENT TELEPHONE-INTERCOM AND DOOR RELEASE SYSTEM

John T. Matthews, Burnaby, British Columbia, Canada, assignor to Automatic Electric Laboratories, Inc., Northlake, Ill., a corporation of Delaware Filed July 11, 1966, Ser. No. 564,266
Int. Cl. H04m *11/00*
U.S. Cl. 179—39 13 Claims

ABSTRACT OF THE DISCLOSURE

An apartment-building intercom and door release arrangement which is integrated with a regular telephone system so that the tenant can communicate with the visitor from the regular telephone in his apartment over his two-wire subscriber line and can open the entrance door by the actuation of a calling device at this phone. Privacy of conversation is safeguarded for both intercom and central office calls. Furthermore, in the case of a party line, one party can hold a phone conversation with the central office while the other is engaged in an intercom connection with the door station and vice versa. If, during his intercom conversation with the visitor, the tenant receives a central office call the tenant is signalled by the application of a call-waiting tone to his line. Conversely, if the tenant receives a call from the door while he is busy in a central office call, the door call is signalled to him by a different call-waiting tone. Upon receipt of this tone the tenant can switch himself to the door station and, at his option, abandon or hold the central office connection.

Figure 1:
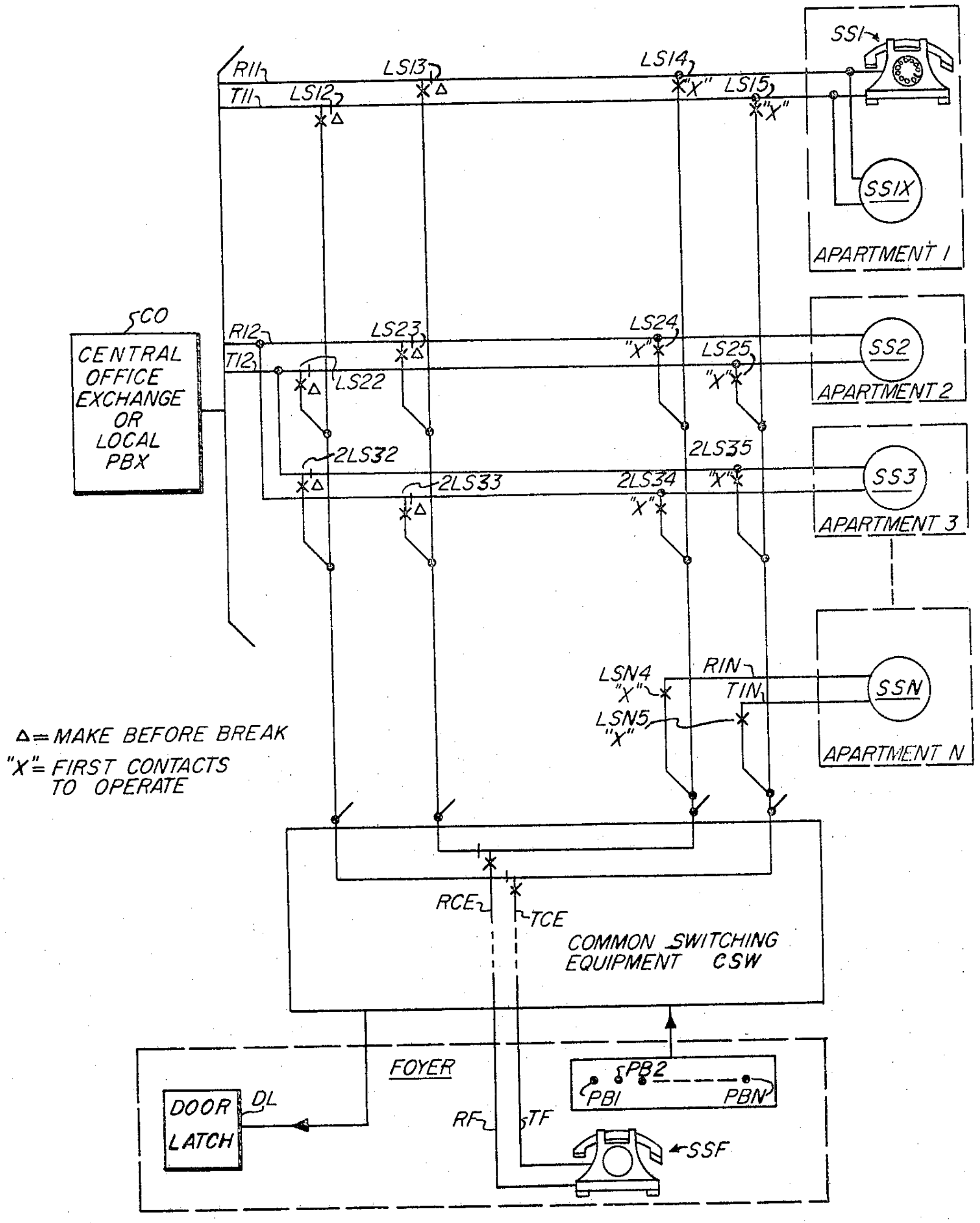

This invention relates in general to communication systems, and in particular to apartment biulding intercom systems of the type wherein release of a normally-locked common entrance door is remotely controlled from any of the apartments.

In apartment buildings which have a normally-latched common entrance door, it is a usual practice to provide an intercommunication system between the several apartments and the common entrance or foyer. Generally speaking, such a system comprises a foyer station including means for selectively signaling the apartments and means for conversing with the tenant of the selected apartment, and a station in each apartment which includes means for signaling an incoming call from the foyer, means for conversing with the door caller, and means for releasing the latch on the common door to admit the door caller to the building.

Heretofore, apartment intercom stations have usually been affixed to or built into a wall immediately adjacent the apartment door for economy of installation and so that a tenant could promptly be on hand to greet a guest at his own apartment door after having admitted the guest to the apartment building hrough the foyer enrance door. Standardized intercom station locations, however, are not convenient, nor do they suit the needs of most tenants; several reasons for such inconvenience are: (1) not all callers are admitted as guests and the tenant need not be present at his apartment door, (2) apartment doors are generally located at the most active areas of the household, (3) only in apartments of smaller buildings, and in those apartments which are near the foyer of larger buildings, is it necessary for a tenant to be immediately on hand to greet a guest, (4) the relative locations of a door intercom station and a telephone station are generally such that a tenant is inconvenienced should he receive a door call while he is engaged in a telephone call, or vice-versa and (5) persistent nuisance door calls must be ignored rather than blocked while the tenant summons assistance from the building manager or the police by means of his telephone instrument.

By way of contrast, in commercial telephone systems, the subscriber substations are installed in locations most convenient to the individual subscriber; that is, in traffic areas and, by means of extension subsets, in more than one area of activity or work such as a kitchen or a bedroom.

Another problem is the loss of privacy that arises in some apartment intercom systems which allow a tenant in one apartment to listen in on a door call of a tenant in another apartment. Loss of privacy also stems from the usual practice of employing loudspeaking equipment at the foyer station. Such loss of privacy is a disasvantage to both the tenant and the visitor.

Intercom systems in which the door latch is controlled by the untimed actuation of a pushbutton in an apartment suffer from a problem which is another disadvantage to the tenant and to the visitor. In such systems, if a tenant releases the pushbutton too soon, or if the visitor is slow in opening the entrance door, the visitor may unintentionally be denied access to the building and a second door call must be made.

It is therefore the primary object of the invention to provide an improved combination telephone-intercom and door release system which overcomes the above problems and disadvantages of separate door intercom and telephone systems.

Another object of the invention is to provide a telephone-intercom system wherein a tenant-subscriber may utilize his telephone instrument to place telephone calls, receive telephone calls, receive intercom calls and control release of the foyer entrance door.

Another object of the invention is to provide an improved telephone-intercom system in which each telephone substation has a first line appearance to incoming telephone calls and another line appearance to incoming door calls and in which a distinctive call-awaiting signal is provided to one of said line appearances when said substation is in use over the other line appearance.

It is another object of the invention to provide a telephone intercom system wherein a tenant-subscriber may hold an exchange call and transfer to an incoming door call to converse with the door caller, control the latch of the common entrance door to admit or deny the door caller access to the apartment building, and transfer back to the exchange call, all automatically, by simply operating the dial of his telephone instrument.

Briefly, the present invention provides a telephone-intercom and door release system wherein the telephone instrument and telephone line of the tenant-subscriber are advantageously and conveniently utilized for both exchange calls and door calls, and for controlling release of a common entrance door. A plurality of pushbuttons, each associated with a separate apartment telephone is located in the foyer as means for initiating door calls to the individual apartments. Also located in the foyer is a telephone substation by which visitors may converse with selected tenant-subscribers. The foyer substation is connectable to any of the apartment substations by means of common switching apparatus under the control of the plurality of pushbuttons and the called apartment substations. The common switching apparatus also provides ringing, call-waiting, and ring-back signals and performs certain timing operations which will be explained in detail below.

In addition to overcoming the above disadvantages which inconvenience tenants and guests, the present invention provides a particular advantage to the building owner and to the equipment installer. No wiring, other than the apartment telephone lines and the lines to the entrance door, is necessary. In new buildings, the telephone lines are easily installed and in older buildings a minimum of wiring installation is needed. Also, each tenant need not subscribe to commercial telephone service, using his line for door calls and door release only; however, he may later subscribe to commercial service, his line being readily adaptable to such a requirement since the switching apparatus may be installed adjacent the conventional telephone line terminal box which serves all the lines of a building.

Another advantage of the present invention resides in the utilization of the inherent transmission quality of the commercial telephone instrument to realize an intercom system capable of quality transmission.

Figure 3:
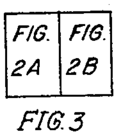
Figure 2A:
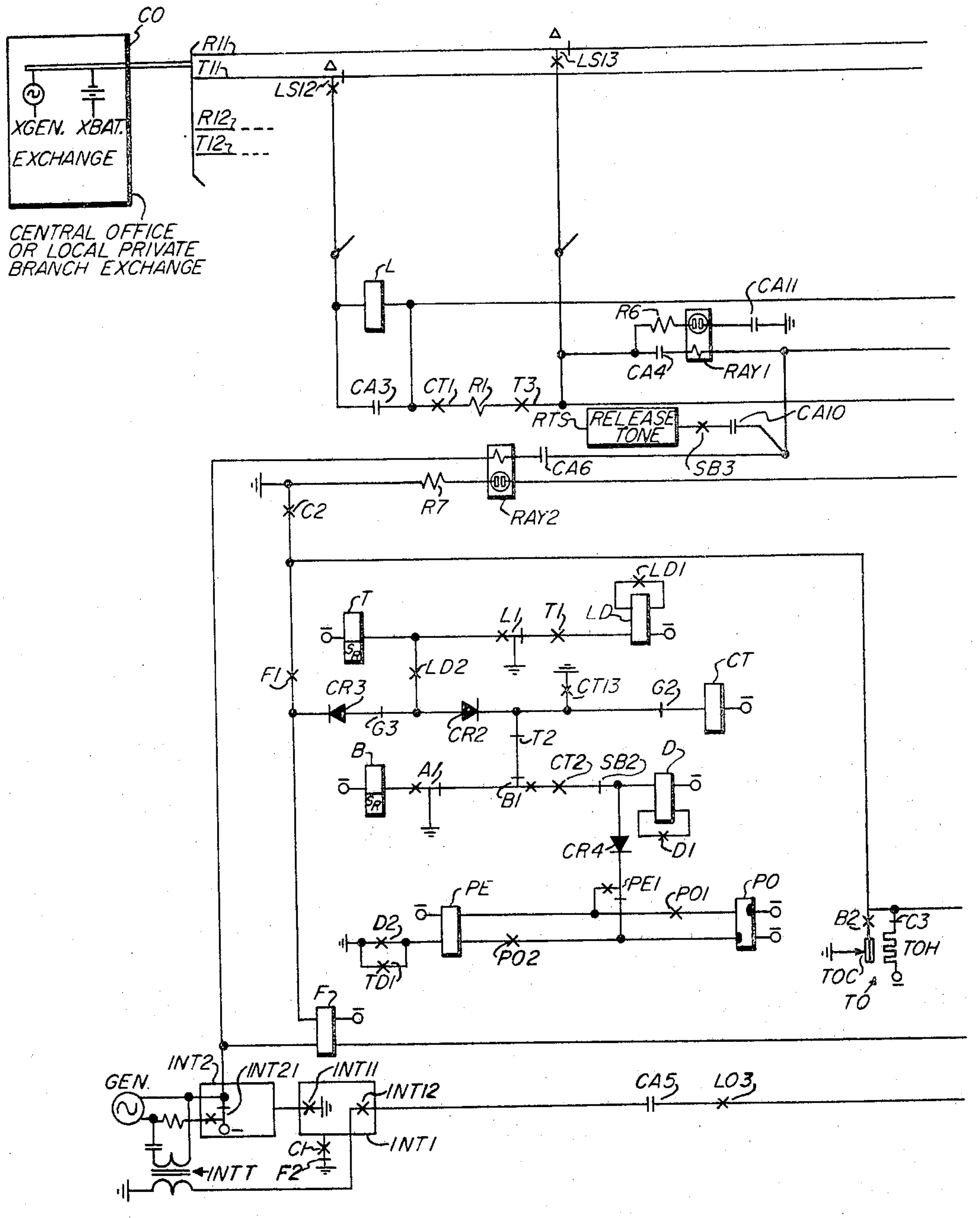
Figure 2B:
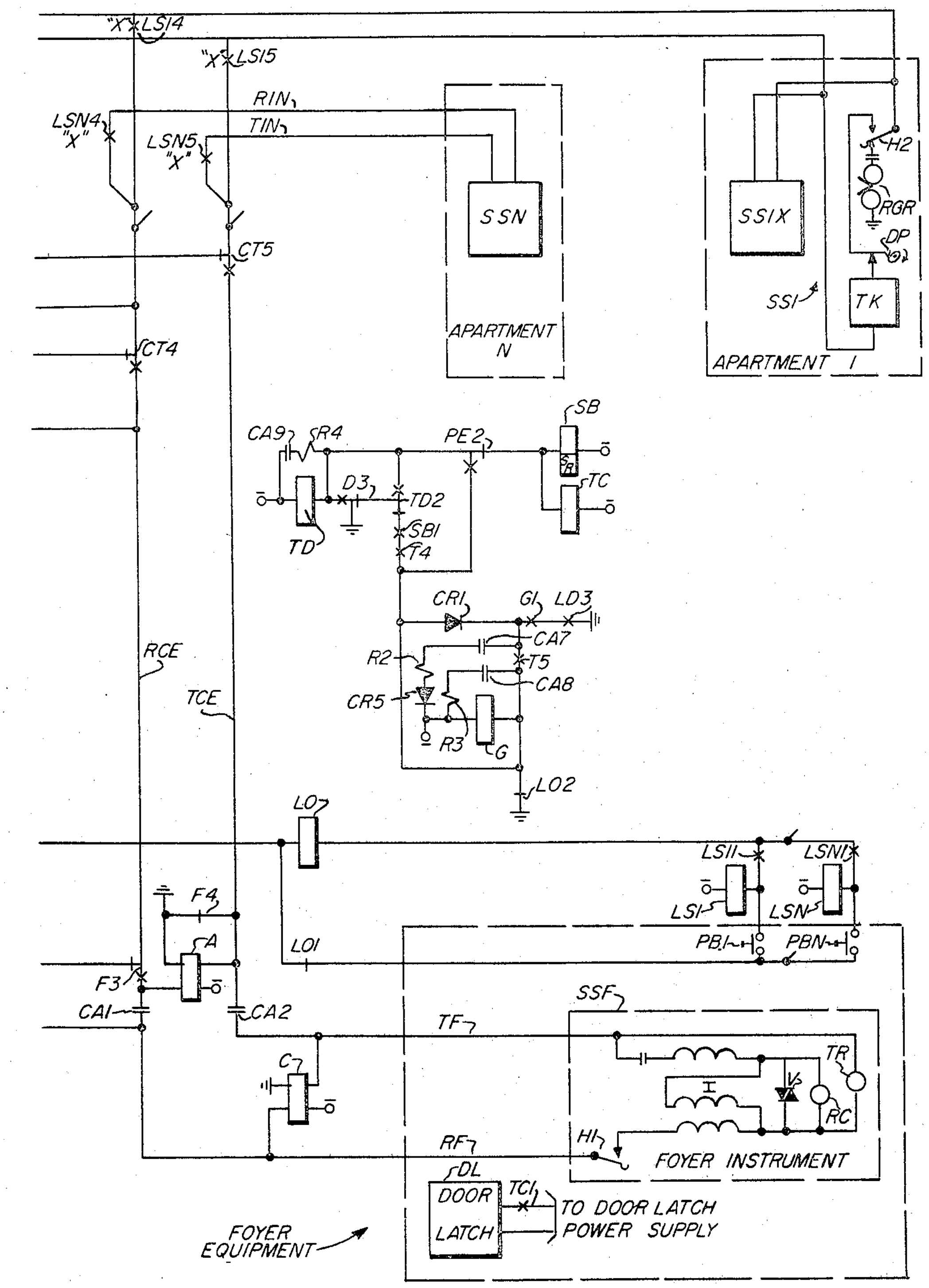

Other objects, features and advantages of the invention, together with its construction and operation, will be better understood from the following detailed description of the invention taken in conjunction with the accompanying drawings in which:

FIG. 1 is a schematic representation of an embodiment of the invention showing in general the relationships between the apartment substations, the subscriber lines, the foyer substation, and the common switching equipment;

FIGS. 2*a* and 2*b* together form a schematic circuit diagram of the embodiment of the invention which is generally shown in FIG. 1; and FIG. 3, appearing on the same sheet as FIG. 1, is a block diagram showing the proper orientation for FIGS. 2*a* and 2*b*.

GENERAL DESCRIPTION

Referring to FIG. 1, there is shown a plurality of subscribed substations SS1–SS3, located in separate apartments, and connected to a central office CO by way of subscriber lines R11, T11–R12, T12 as is well known in the art. An additional subscriber substation SS1X is shown connected as an extension telephone in Apartment 1. Substation SSN is illustrated as not having commercial telephone service; therefore, its subscriber line is not connected to the central office. The foyer equipment comprises an electric door latch DL, a plurality of pushbuttons PB1–PBN and a foyer telephone substation SSF. Station SSF is connectable to any of the apartment substations by way of the common switching equipment CSW.

Referring to FIGS. 2*a* and 2*b*, there is shown a circuit diagram of the common switching equipment CSW and interconnections between the switching equipment, the subscriber lines and the foyer equipment. The talking circuits of the substations, referenced TK in substation SS1, may be of the well-known telephone speech circuits, such as that shown for substation SSF including a transmitter TR, a receiver RC and an induction coil I. The switching equipment CSW comprises battery feed relays C and A for the foyer subset and the apartment subsets, respectively, a link holding relay B and a ring trip relay F.

Subscriber lines R11, T11 and R1N, T1N which serve Apartment 1 and Apartment N, respectively, are the only lines shown in detail in FIGS. 2*a* and 2*b*. Associated with separate ones of these lines are relays LS1 and LSN, the line switching relays which connect their associated apartment lines through the common switching equipment. Relay A, the battery feed relay for the answering tenant, receives and repeats dial pulses. Relay B, slow to release, and holds the link under the control of relay A. Relay C, the battery feed relay for subset SSF, controls the starting of the ringing circuit and disablement of the time out circuit TO.

The ringing circuit comprises a generator GEN, transformer INTT, interrupter INT1 and interrupter INT2 and provides the ringing, call-waiting and re-ring signals to the appropriate substations. Relay F is the ring-trip relay which stops the ringing circuit and couples the called apartment substation to the calling foyer substation. Relay G prevents premature cut-through to a busy apartment line. Relay TD and its associated circuitry determines the release interval of the electric door latch DL. Transfer from the exchange line to the foyer line is accomplished through the operation of relay CT.

The functions of the remaining circuits of the common switching equipment and the cooperative connections between those circuits and the above circuits will become apparent from the following description of operation.

CALL FROM FOYER

A visitor at the building entrance who wishes to gain access to a particular apartment, say Apartment 1, lifts the handset of the foyer instrument SSF closing hookswitch contacts H1 to operate relay C. Contacts C1 close starting interrupter INT1 which provides a ground via contacts INT11 to start interrupter INT2; contacts C3 open the heater element TOH of the time out circuit TO; and contacts C2 close to prepare an operating path for relays LO and the LS relays. The caller then depresses pushbutton PB1 which is associated with Apartment 1. Relay LS1 operates over the previously prepared circuit from ground via contacts C2, contacts LO1 and pushbutton PB1. Relay LS1 operates and locks in series with relay LO from ground via contacts C2, the winding of relay LO and contacts LS11. Contacts LS12, LS13, LS14, and LS15 operate to switch the subscriber line R11, T11 through the common equipment. Contacts LS14 and LS15 are X contacts and LS12 and LS13 are make-before-break contacts so that switching does not interfere with dialling or talking which may already be taking place on the subscriber line R11, T11.

When relay LO operates, contacts LO1 open the ground path to the pushbuttons and prevents accidental operation of any other LS relay. Contacts LO3 close to provide ring-back tone to the caller via generator GEN, transformer INTT, contacts INT12 of interrupter INT1, capacitor CA5, and contacts LO3 even though actual ringing may not have yet started on the subscriber line which is being tested for a busy or an idle condition. Contacts LO2 open the circuit to the normally operated relay G which is slow to release to allow for the busy test before cut-through to the subscriber line.

The busy test is provided by the line supervisory relay L and its associated relay T and will be described below since the tenant-subscriber has several options of performance which include operation of the equipment as if his line were idle. For an idle line, relays L and T are not operated.

Relay G will hold for the busy test interval, for example one second, on the discharge of capacitance CA8. When relay G releases, contacts G2 close to provide an operating ground via contacts A1, B1, T2, and G2 for relay CT. A ringing signal is provided from battery connected generator GEN via contacts INT21 of interrupter INT2, the lower winding of relay F, contacts F3, contacts CT4, contacts LS14, and hookswitch H2 to operate the ringer RGR of substation SS1. The two interrupters used together in the common equipment provide a distinctive ringing interval so that the tenant may differentiate between an exchange call and a foyer call. With relay G restored, relay CT is provided a holding ground through its contacts CT3.

When the tenant goes off-hook to answer the door call, relay F is operated to trip the ring, stop the interrupter and complete the answering station loop to relay A. Relay F is operated by ground supplied via contacts F4, in parallel with the upper winding of relay A, contact CT5, contacts LS15, substation SS1 (or extension station SS1X), contacts LS14, contacts CT4, contacts F3 and the lower winding of relay F which has battery connected to its other terminal from the battery connected generator GEN via interrupter INT2. Interrupter INT1 is disabled by the opening of contacts F2 and the operation of contacts F3 and F4 in the just-traced path to complete the direct current loop to station SS1 through relay A.

Relay A operates and at its contacts A1 supplies operating ground to relay B which, in turn, operates and at contacts B2 closes a multiple holding ground for relays L0 and LS1 through contact TOC of the time out circuit TO. Contacts B1 transfer and prepare a pulsing circuit for relays PO and PE. Subset SS1 is connected for conversation with the foyer subset SSF by way of contacts LS14, LS15, CT4, CT5, and F3, and capacitances CA1 and CA2. Conversation between the apartment tenant and the door caller may now take place.

ENTRANCE DOOR RELEASE

If the tenant wishes to release the entrance door latch to admit his guest, he may do so by means of his dial DP. For the particular circuit illustrated, the tenant would dial any even digit. The door caller places the foyer subset back on-hook to release relay C which removes a portion of a multiple ground path for relays LO and LS1 at contact C2, and starts timer TO by providing a ground to its heater element TOH via contacts TOC, B2 and C3. The tenant operates his dial DP and, as is well known in the art, relay A repeats each dial pulse.

On the first dial pulse, relay A releases and contacts A1 provide an operating ground for relays D and PO. Relay D operates from a ground via contacts A1, B1, CT2 and SB2. Contacts D1 provide relay D with a shorted windings so that it is slow to release and holds during pulsing. Relay PO is operated on its lower winding from ground extending via contacts A1, B1, CT2, SB2, diode CR4 and contact PE1. Relay PE operates over a circuit extending from ground via contacts D2, lower winding of relay PE, contacts PO2 and lower winding of relay PO to battery.

Relay D also operates relay TD by way of contacts D3. Relay TD will hold for a predetermined interval, say 8 seconds, after which relay D releases due to the discharge of capacitor CA9 via resistance R4. This predetermined interval determines the unlatched time of the entrance door.

On the second dial pulse, relay A releases and holding ground is supplied to relay PE via contacts A1, B1, CT2, SB2, diode CR4, and contacts PE1 to the upper winding of relay PE. The upper and lower windings of relay PO are in opposition causing relay PO to release. Relay A reoperates at the end of the second pulse to open the holding circuit to relay PE at contacts A1 and relay PE releases. Therefore, relays PO and PE form a bistable circuit, and after odd numbers of pulses, relays PO and PE will be operated, and after even numbers of dial pulses, relays PO and PE will be restored. In the present example relays PO and PE will be in the restored condition after the fourth dial pulse. Relays still operated are A, B, D, TD, F, CT, LO, and LS1.

Relay D will release at the end of the last dial pulse since contacts A1 are operated. When relay D releases, contacts D3 open the circuit to relay TD which will hold for a predetermined interval as previously mentioned on the discharge of capacitance CA9 via resistance R4 and the winding of relay TD. With relays PE and D released, and relay TD operated, there is a circuit to operate relays SB and TC from a ground via contacts D3, TD2, and PE2. Operation of relay TC closes contacts TC1 to provide power to operate the entrance door latch DL. Relay SB closes a tone signal from source RTS to the apartment line at contacts SB3 via capacitance CA10 and contacts LS14 to indicate to the tenant subscriber that the apartment door is in the released condition. Contacts SB2 prevent reoperation of relays D and PO upon release of relay A, since relay B is slow to release.

When the tenant goes on-hook, and opens the direct current loop to relay A, relay A restores and relay B is released. Contacts B2 open ground circuit through time out contacts TOC to relays F, LO, and LS1 which release quickly. Relay G reoperates on the release of relay LO via the ground supplied at contacts LO2. Contacts G2 open to remove the holding ground from relay CT which releases. The equipment is then back to a normal idle condition.

APARTMENT LINE BUSY

If the door caller encounters a busy apartment subscriber line when the subscriber line is switched through the common equipment, relay L will operate on the direct current loop previously established between the central office battery XBAT and the subscriber station SS1. Contacts L1 operate to provide operating ground for relay T. With relays LO and T operated, relay G will hold for a predetermined interval, say 8 seconds, on the discharge of capacitances CA7 and CA8 which are in parallel due to the closure of contacts T5. This interval prevents unintentional holding of an exchange call and switching through to a door call when the busy line is in the outdialling mode. Further, it prevents release of the door which might occur if an even number of pulses were detected by relay A as described above.

With relays G or T operated, relay CT can not operate and switch the apartment line to the caller at the entrance door. The interrupted ringing signal operates over two paths when a line busy condition is encountered so that the ringing current is transformed to a call-waiting tone. The first path extends from the generator GEN through contacts INT21 of interrupter INT2, the lower winding of relay F, contacts F3, the lamp element of resistor RAY2 and resistance R7 to ground. The resistance of element RAY1 (and element RAY2) is dependent upon and inversely proportional to the intensity of illumination of its lamp element. In the present example the ringing current lowers the value of the resistance element of resistor RAY2 from approximately 50 megohms to 2500 ohms. The second path of interrupted ringing signal extends from the generator-interrupter combination to signal the talking circuit TK of substation SS1, the path including the resistance element of resistor RAY2, capacitance CA6, contacts LS14 and hookswitch contacts H2, talking circuit TK, contacts LS15, contacts CT5 and the upper winding of relay A to ground.

Upon hearing the distinctive call-waiting tone signal in the receiver of his talking circuit, the tenant may terminate his exchange call and wait for his subset to ring as previously explained; however, a preferred method of answering might be to hold the exchange call before answering the door call. This is done by dialing an odd digit, for example the digit one. During the dial pulse of the digit one, or during the first of an odd number of dial pulses, relay L releases by virtue of the open loop and contacts L1 provide operating ground via contacts T1 to relay LD. Relay LD is slow to release due to the slugging effect of contacts LD1 which short its upper winding.

Relay L reoperates at the end of the pulse to operate relay CT from ground through contacts L1, LD2, diode CR2 and contacts G2. Relay F is also operated via contacts L1, LD2, G3 and diodes CR3 to instantaneosuly trip the ring by opening contacts F2 in the start lead of interrupter INT1 and by transferring contacts F3. Relay F locks up on its upper winding from the ground supplied via contacts C2 and F1. Contacts CT4 and CT5 switch the apartment line to the direct current loop to relay A which operates and couples the apartment line to the entrance door line via capacitances CA1 and CA2. The exchange line is placed in a hold condition by the bridging of resistance R1 thereacross via contacts T3 and CT1.

Remembering that relays PO and PE are in the operated condition in response to an odd number of dial pulses, contacts PE2 prevent operation of relay TC and the entrance door is not released.

ENTRANCE DOOR RELEASE AND TRANSFER TO EXCHANGE LINE

If, with the exchange line in hold condition (relays LO, LS1, A, B, F, L, T and CT operated), a tenant-subscriber desires to release the entrance door he will dial an even numbered digit so that relays D and TD are operated at the end of the digit and, since relays PO and PE are not operated in the instant case, relays TC and SB operate upon the release of relay D. Relay TC causes the door latch to be opened and relay SB provides for the application of release tone to the subscriber line, as described above.

When relay TD releases after the predetermined discharge interval of capacitance CA9, there is a complete circuit for a momentary operation of relay G from ground via contacts D3, TD2, SB1 and T4 since relay SB is slow to release. This momentary operation causes contacts G2 to open the holding circuit for relay CT causing it to release and switch back to the exchange call by operation of contacts CT1, CT4 and CT5. The direct current loop to relay A is opened by virtue of the transfer at contacts CT4 and CT5 causing relay A to release and, in turn, release the remainder of the common switching equipment.

TRANSFER TO IDLE OR HELD EXCHANGE LINE WITHOUT RELEASING ENTRANCE DOOR

If the tenant subscriber does not wish to release the entrance door, he may connect to his exchange line by dialing an odd digit. As explained above, relay A repeats the digit, and relays D, TD, PO, and PE are in the operated condition at the end of the digit. Contacts PE2 prevent relay TC from operating, and thereby prevent release of the door.

Relay D releases closing an operating ground circuit for relay G via contacts D3, TD2 and PE2. Contacts G2 open the ground circuit for relay CT causing transfer back to the exchange line at contacts CT4 and CT5. The tenant may resume conversation if the subscriber line was in the held condition. If the line was idle and the door caller has persisted in making nuisance calls, the tenant subscriber, after transfer and upon receiving dial tone from the central office, may dial the building manager or the police for assistance.

EXCHANGE ACCESS OF BUSY INTERCOM CONNECTIONS

There is a possibility that a tenant may receive an exchange call while he is engaged in conversation with a door caller. In such a situation, a ringing current from the exchange generator XGEN will be applied to resistor RAY1 via line conductor R11 and contact LS13 where it is converted to a second distinctive call-waiting tone. A first path for the exchange ringing current traverses resistance R6, the lamp element of resistor RAY1 and capacitance CA11 to ground to lower the resistance value of RAY1 as previously explained.

The second path for the ringing current traverses capacitance CA4, the resistance element of resistance RAY1, contacts LS14 and hookswitch H2 to the talking circuit TK, of subset SS1 to provide the tenant with call-waiting tone. The tenant may then terminate his door call and receive his exchange call.

PARTY LINE OPERATION

Turning again to FIG. 1, it will be appreciated that party line operation is accomplished by providing each party, (i.e. SS2 and SS3), with his own LS relay and transposing the ring and tip line conductors of the second party, in this case substation SS3, so that tip ringing for substation SS3 is from the ring side of the line with respect to station SS2. Because of the dual line appearances of each substation due to the isolation of the substation by their LS contacts, either party may make or receive exchange calls while the other is engaged in a door call, and may receive a door call while the other is engaged in an exchange call.

It will be appreciated that while the present invention has been illustrated and described with specific reference to apartment building application, the invention may be utilized in any type of a building or a construction complex where there is a need for security and privacy.

The invention may be modified by those skilled in the art to provide other foyer substations for buildings which have additional common entrance doors. Such modifications would include the addition of busy lamps at the foyer station and automatic exclusion equipment to prevent a line from being seized by more than one foyer station.

Other changes and modifications may be made in the invention by those skilled in the art without departing from the spirit and scope of the invention, and should be included in the appended claims.

What is claimed is:

1. An apartment building intercom system comprising a plurality of telephone substations located in separate apartments of said building and each including a calling device for producing calling signals,
   - a central office,
   - a plurality of two-wire subscriber lines which in the normal condition of the system separately connect said substations to said central office,
   - a door latch at the entrance of said building,
   - an intercom station located at said entrance,
   - an intercom line associated with said intercom station,
   - manually operable means at said intercom station for selecting one of said substations, and
   - switching means defining a point of juncture between each of said two-wire subscriber lines and said intercom line and permitting each said subscriber line to be divided into a substation section and a central office section,
   - said switching means including;
   - means for supervising said two-wire subscriber lines,
   - means jointly controlled by said manually operable means and said supervisory means for transferring the substation section of the selected two-wire line from the respective central office section to said intercom line; and
   - means associated with said intercom line and operated upon the receipt thereby of predetermined calling signals from the substation section of said two-wire line to release said entrance door latch.

2. An intercom system as claimed in claim 1 wherein said calling device is a dial; wherein said switching means include a binary circuit for counting the number of dial impulses received from the selected substation; and wherein said binary circuit causes the entrance door latch to be released when said circuit at the end of the impulse series is in a predetermined one of its two binary states.

3. An intercom system as claimed in claim 1 wherein said switching means include a door latching releasing switch and means for automatically maintaining said switch actuated for a predetermined interval, thereby to insure safe release of said door latch independently of the state of said two-wire subscriber line.

4. An intercom system as claimed in claim 1 wherein said switching means include a switching device operated upon receipt of said predetermined calling signals to cause signal indicative of the door latch release to be returned to said selected substation.

5. An intercom system as claimed in claim 1 wherein said supervisory means are provided in common to said plurality of two-wire lines and are connected to the selected two-wire subscriber line upon actuation of said manually operable means.

6. An intercom system as claimed in claim 1 wherein said switching means include means which, depending on the condition of the supervisory means, cause said selected substation to be rung if said line is found idle and cause a call-waiting tone to be transmitted to said substation if said line is found busy in a central office call.

7. An intercom system as claimed in claim 1 wherein said supervisory means, upon receipt over the corresponding two-wire line of calling signals from the selected substation while said substation is busy in a central office call, cause the substation section of said two-wire line to be connected to said intercom line and the central office section of said two-wire line to be held.

8. An intercom system as claimed in claim 1 wherein the means associated with said intercom line, when operated upon the receipt thereby of other calling signals from the selected substation over the corresponding two-wire line, cause the substation section of said two-wire line to be transferred back from said intercom line to the central office section of said two-wire line.

9. In a telephone system including a central office for switching telephone calls, a plurality of telephone substations in separate locations of a construction having an entrance door which provides access to said locations, each said substation having a calling device for producing call signals, and a plurality of two-wire subscriber lines separately connecting said substation to said central office an intercom and entrance-door-release arrangement comprising:

means releasably latching said entrance door, an intercom station located at said entrance, an intercom line associated with said intercom station, each of said two-wire lines having between it and said intercom line a point of junction defining a substation section and a central office section of said two-wire line, manually operable means at said intercom station for selecting one of said substations, and control means at said junction point including:

means for supervising said two-wire subscriber lines, means jointly controlled by said manually operable means and said supervisory means for transferring the substation section of the selected two-wire line from the respective central office section to said intercom line, and means associated with said intercom line and operated upon receipt thereby of predetermined calling signals from the substation section of said two-wire line to actuate said door latch releasing means and cause the substation section of said two-wire line to be automatically transferred back from said intercom line to the central office section of said two-wire line.

10. In a telephone system, a central office, a plurality of substations, a plurality of two-wire subscriber lines connecting said substations to said central office, an intercom line, each of said two-wire lines having between it and said intercom line a point of junction defining a substation section and a central office section of said two-wire line, said two-wire lines including individual subscriber lines each associated with an individual one of said substations, and also including a party-line associated with first and second party-line substations, said party-line having a central office section common to, and a substation section individual to, said first and second substation, manually operable means at said intercom station for selecting any one of said individual and party-line substations, means at said junction point for supervising said two-wire subscriber lines, and means jointly controlled by said manually operable means and said supervisory means for transferring the corresponding selected substation section, including either of said party-line substation sections, from the respective central office section to said intercom line, so that either of said party-line substations may be conditioned for an intercom call while the other party-line substation is conditioned for a central office call.

11. In a telephone system, a two-wire subscriber line having two paths of access, the first path being available for a first type of calls to said line and, in the case of a call of said first type, having ringing current of a first code applied thereto, and the second path being separately available for a second type of calls to said line and, in the case of a call of said second type, having ringing current of a second ringing code applied thereto, and control means at the point of junction of said two access paths, comprising:

means for converting said first ringing current to a first call-waiting tone signal, means for converting said second ringing current to a distinct second call-waiting tone signal, and means for supervising the state of said two access paths; said supervisory means permitting said first ringing current to be passed to said subscriber line if said line is idled, and enabling said first conversion means to apply said first call-waiting tone signal to said line if said line is busy in a telephone connection extending over said second path of access; and said supervisory means permitting said second ringing current to be passed to said subscriber line if said line is idle and enabling said second conversion means to apply said second call-waiting tone signal to said line if said line is busy in a telephone connection extending over said first path of access.

12. The combination in a telephone system as claimed in claim 11, wherein each of said converting means comprises a primary circuit and a secondary circuit, both said circuits being capacitatively coupled to the respective path of access and the secondary circuit being normally of a relatively high impedance but being changed to a relatively low impedance responsive to the flow of the respective ringing current through said primary circuit.

13. The combination in a telephone system as claimed in claim 11, wherein said two-wire subscriber line is normally connected to said first path of access, and wherein said control means comprise:

means controlled from said second path of access to condition said line for connection to said second path of access, and means subsequently operated in response to a control of one kind exerted over said two-wire line while said second call-waiting tone signal is applied to said line, to terminate the telephone connection existing over said first path of access and permit said second ringing current to be passed to said line, and operated in response to a control of a different kind exerted over said two-wire line while said second call-waiting tone signal is applied to said line to transfer said line to said second path of access, discontinue the application of said call-waiting tone signal and hold the telephone connection existing over said first path of access.

References Cited

UNITED STATES PATENTS

| | | | |
|---|---|---|---|
| 2,557,161 | 6/1951 | Timms. | |
| 3,112,373 | 11/1963 | Weinberg. | |
| 3,342,934 | 9/1967 | Kohn et al. | |
| 2,496,159 | 1/1950 | Hagens | 179—37 |

| | | | |
|---|---|---|---|
| 3,156,781 | 11/1964 | Hemminger | 179—84 |
| 3,284,571 | 11/1966 | Wittig | 179—2 |

KATHLEEN H. CLAFFEY, Primary Examiner
J. S. BLACK, Assistant Examiner

U.S. Cl. X.R.

179—2